United States Patent
Johnson et al.

(10) Patent No.: US 10,982,744 B2
(45) Date of Patent: Apr. 20, 2021

(54) ELECTRONICALLY CONTROLLED DIFFERENTIAL LOCKER

(71) Applicant: GKN Automotive Limited, Worcestershire (GB)

(72) Inventors: Rory M. Johnson, Grand Blanc, MI (US); Ryan L. Pruitt, Warren, MI (US)

(73) Assignee: GKN Automotive Limited, Worcestershire (GB)

( * ) Notice: Subject to any disclaimer, the term of this patent is extended or adjusted under 35 U.S.C. 154(b) by 0 days.

(21) Appl. No.: 16/468,308

(22) PCT Filed: Dec. 19, 2017

(86) PCT No.: PCT/US2017/067303
§ 371 (c)(1),
(2) Date: Jun. 11, 2019

(87) PCT Pub. No.: WO2018/118912
PCT Pub. Date: Jun. 28, 2018

(65) Prior Publication Data
US 2020/0079214 A1 Mar. 12, 2020

Related U.S. Application Data

(60) Provisional application No. 62/438,118, filed on Dec. 22, 2016.

(51) Int. Cl.
*F16H 48/34* (2012.01)
*B60K 23/04* (2006.01)
(Continued)

(52) U.S. Cl.
CPC ............. *F16H 48/34* (2013.01); *B60K 23/04* (2013.01); *F16D 27/118* (2013.01); *F16H 48/08* (2013.01);
(Continued)

(58) Field of Classification Search
CPC ........ B60K 23/04; B60K 17/00; B60K 17/16; B60K 17/165; B60K 17/20; B60K 17/344;
(Continued)

(56) References Cited

U.S. PATENT DOCUMENTS 3,055,234 A   9/1962   O'Brien
5,275,254 A   1/1994   Shiraishi et al.
(Continued)

OTHER PUBLICATIONS

Written Opinion & International Search Report for PCT/US2017/067303 dated Mar. 9, 2018, 8 pages.

*Primary Examiner* — David R Morris
(74) *Attorney, Agent, or Firm* — Jennifer M. Brumbaugh; Reising Ethington P.C.

(57) ABSTRACT

In at least some implementations, a system for a vehicle differential having multiple gears includes a coil of wire, a drive member movable in response to a magnetic field generated by application of electricity to the coil between a first position and a second position, and a lock member coupled to the drive member for movement with the drive member throughout a range of movement of the drive member. The lock member is adapted to engage a gear of the differential when the drive member is in the second position and the lock member is adapted to be disengaged from the gear when the drive member is in the first position. In this way, the differential may be selectively locked.

11 Claims, 7 Drawing Sheets

(51) Int. Cl.
*F16H 48/24* (2006.01)
*F16D 27/118* (2006.01)
*F16H 48/08* (2006.01)
*F16H 48/20* (2012.01)

(52) U.S. Cl.
CPC ....... *F16H 48/24* (2013.01); *F16H 2048/204* (2013.01); *F16H 2048/346* (2013.01)

(58) Field of Classification Search
CPC .... B60K 17/346; B60K 17/348; B60K 17/35; B60K 2023/046; B60K 2023/0841; B60K 23/08; B60Y 2400/421; F16H 2048/204; F16H 48/24; F16H 48/08; F16H 48/34; F16D 27/118
See application file for complete search history.

(56) References Cited

U.S. PATENT DOCUMENTS

| | | | |
|---|---|---|---|
| 6,827,661 B2 * | 12/2004 | Fusegi | B60K 23/04 475/150 |
| 6,945,895 B2 * | 9/2005 | Fusegi | B60K 23/04 180/247 |
| 7,074,150 B2 * | 7/2006 | Fusegi | B60K 23/04 475/150 |
| 7,247,118 B2 * | 7/2007 | Haruki | F16H 48/08 335/279 |
| 7,862,462 B2 * | 1/2011 | Fusegi | F16H 48/24 475/231 |
| 7,887,450 B2 * | 2/2011 | Fusegi | F16H 48/30 475/150 |
| 7,892,134 B2 * | 2/2011 | Fusegi | F16H 48/24 475/235 |
| 8,050,829 B2 | 11/2011 | Johnson et al. | |
| 8,287,417 B2 * | 10/2012 | Sudou | F16H 48/34 475/231 |
| 8,348,799 B2 * | 1/2013 | Maruyama | F16H 48/08 475/150 |
| 8,591,375 B2 * | 11/2013 | Maruyama | F16H 48/30 475/231 |
| 9,970,525 B2 * | 5/2018 | Zaers | F16H 48/08 |
| 9,989,140 B2 * | 6/2018 | Onitake | F16H 48/24 |
| 10,308,113 B2 * | 6/2019 | Inose | F16H 48/34 |
| 10,465,784 B2 * | 11/2019 | Komatsu | F16H 48/34 |
| 10,520,334 B2 | 12/2019 | Creech et al. | |
| 2002/0155913 A1 * | 10/2002 | Fusegi | B60K 23/04 475/150 |
| 2003/0162622 A1 * | 8/2003 | Fusegi | B60K 23/04 475/231 |
| 2005/0187063 A1 * | 8/2005 | Haruki | F16H 48/34 475/231 |
| 2006/0270508 A1 * | 11/2006 | Gohl | F16H 48/24 475/220 |
| 2007/0054771 A1 * | 3/2007 | Fusegi | F16H 48/30 475/231 |
| 2007/0179008 A1 * | 8/2007 | Fusegi | F16H 48/34 475/231 |
| 2007/0197338 A1 * | 8/2007 | Fusegi | F16H 48/30 475/231 |
| 2008/0009381 A1 * | 1/2008 | Sudou | F16H 48/24 475/231 |
| 2010/0056314 A1 * | 3/2010 | Maruyama | F16H 48/24 475/150 |
| 2010/0179736 A1 | 7/2010 | Johnson et al. | |
| 2011/0105264 A1 * | 5/2011 | Maruyama | F16H 48/30 475/150 |
| 2012/0021862 A1 | 1/2012 | Isken, II et al. | |
| 2016/0273637 A1 * | 9/2016 | Zaers | F16H 48/24 |
| 2017/0219023 A1 * | 8/2017 | Haupt | F16D 27/108 |
| 2017/0254399 A1 * | 9/2017 | Onitake | F16D 27/09 |
| 2017/0276224 A1 * | 9/2017 | Creech | G01D 5/145 |
| 2017/0297428 A1 * | 10/2017 | Inose | B60K 23/04 |
| 2018/0029471 A1 * | 2/2018 | Richards | F16H 48/38 |
| 2019/0178359 A1 * | 6/2019 | Komatsu | F16H 48/34 |

* cited by examiner

FIG. 13

ELECTRONICALLY CONTROLLED DIFFERENTIAL LOCKER

REFERENCE TO RELATED APPLICATIONS

This application claims the benefit of U.S. Provisional Application Ser. No. 62/438,118 filed on Dec. 22, 2016, the entire contents of which are incorporated herein by reference.

TECHNICAL FIELD

The present disclosure relates generally to an electronically controlled vehicle differential locking device.

BACKGROUND

During normal operation of a motor vehicle, it is common that all four wheels might not be turning at an identical rate of speed. Different wheel turn rates are most commonly encountered when the vehicle is making a turn, but may also be caused by braking or non-uniform road surface conditions. In order to accommodate differing wheel turning rates while continuing to direct power to two wheels it is possible to provide a differential that allows for different wheel turn rates between the powered wheels. The differential allows the wheels to spin at different rates while delivering power to each wheel. While this solution may be satisfactory in some driving conditions, it is unsatisfactory under conditions where one of the powered wheels experiences a surface having a much lower coefficient of friction than a surface engaged by the other wheel(s). Such conditions may prevent the application of torque to a wheel with more traction, thereby resulting in undesired vehicle performance. A locking mechanism may be provided to lock the differential and prevent different wheel spin rates between two wheels in at least some circumstances.

SUMMARY

In at least some implementations, a system for a vehicle differential having multiple gears includes a coil of wire, a drive member movable in response to a magnetic field generated by application of electricity to the coil between a first position and a second position, and a lock member coupled to the drive member for movement with the drive member throughout a range of movement of the drive member. The lock member is adapted to engage a gear of the differential when the drive member is in the second position and the lock member is adapted to be disengaged from the gear when the drive member is in the first position. In this way, the differential may be selectively locked.

In at least some implementations, one or both of the drive member and lock member include at least one magnet and the coupling between the drive member and the lock member is magnetic. The drive member and lock member may move axially relative to the coil and one or both of the drive member and the lock member may have at least one axially extending foot with a magnet being carried by the foot. The coil may define an envelope in which the coil wire is received, and the magnet may be located outside of the coil envelope in both the first position and the second position of the drive member. Instead of or in addition to the magnet(s), the lock member may be adhered to or mechanically coupled to the drive member, such as by overlapping and engaged surfaces that remain engaged during movement of the drive member and lock member. The engaged surfaces may include a stop surface and a catch that engages the stop surface.

In at least some implementations, the differential includes a housing with a wall having at least one void, and the coil is located adjacent to one side of the wall and the locking member is located on an opposite side of the wall. At least one of the drive member and the lock member includes a portion extending into or through the void, and the drive member and the locking member may be coupled together across the wall.

In at least some implementations, the system includes a processor communicated with the coil and configured to determine the position of the locking member from a current profile, where the current profile includes an actuation signal applied to the coil to move the drive member relative to the coil and an induced current in the coil caused by movement of the drive member relative to the coil. The current profile may also or instead include a detection current having a magnitude that is less than the actuation signal.

In at least some implementations, a method of determining the status of a differential locking mechanism comprises the steps of:

receiving a signal indicative that the locking mechanism should be in a first position;

determining that the locking mechanism is in a second position and not the first position:

applying a detection current to the locking mechanism;

determining the position of the locking mechanism as a function of the current in the locking mechanism after application of the detection current; and if the determined position of the locking mechanism after application of the detection current is not the first position, then applying another detection current to the locking mechanism and determining again the position of the locking mechanism after reapplication of the detection current.

In at least some implementations, the signal indicative that the locking mechanism should be in the first position is the termination of an actuation signal for the locking mechanism. The detection current may be of lower magnitude than that actuation signal. And the current in the locking mechanism after application of the detection current may be of a magnitude that corresponds to the inductance within the locking mechanism which changes as the position of the locking mechanism changes.

BRIEF DESCRIPTION OF THE DRAWINGS

The following detailed description of preferred implementations and best mode will be set forth with regard to the accompanying drawings, in which.

DETAILED DESCRIPTION

Figure 1:
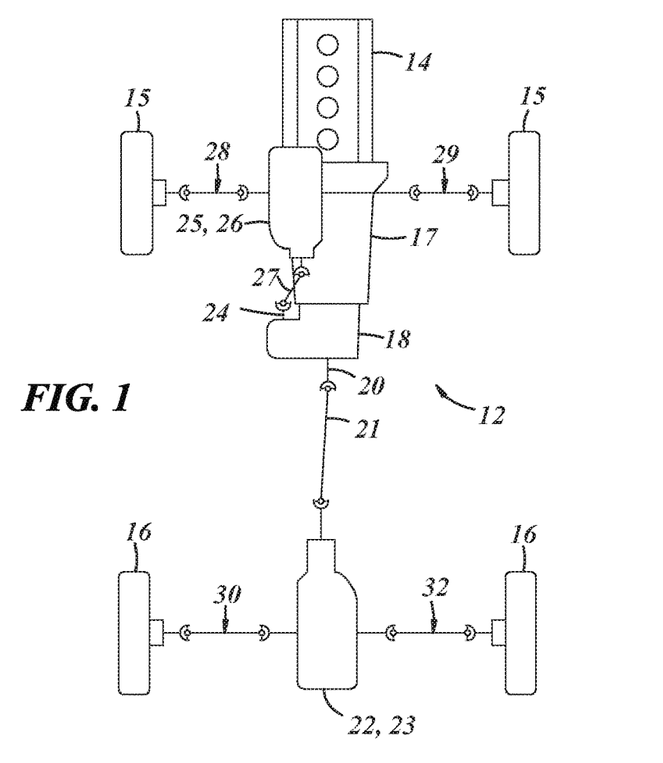
FIG. 1 is a schematic diagram of a vehicle driveline assembly.

Referring in more detail to the drawings, FIG. 1 illustrates a vehicle driveline 12 that provides power from an engine 14 to multiple wheels including front wheels 15 and rear wheels 16. The engine 14 supplies torque via a transmission 17 and a power transfer unit 18 that provides an output shaft 20. The output shaft 20 is coupled to a first prop shaft 21 which is coupled to a rear drive unit 22 that may include a differential assembly 23. The power transfer unit 18 or other device may have an output shaft 24 coupled to a front drive unit 25 (which may include a differential assembly 26) via a second prop shaft 27. Front left and right side shafts 28, 29 are coupled to the drive unit/differential 25, 26 which permits relative rotation between the side shafts 28, 29 and front wheels 15. Rear left and right side shafts 30, 32 are coupled to the rear drive unit/differential 22, 23 which permits relative rotation between the side shafts 30, 32 and rear wheels 16. The power transfer unit 18 may include a disconnect assembly that, when in a connected state, transfers torque to the second prop shaft 27 to drive the front wheels 15. When connected or disconnected, the power transfer unit 18 may provide torque to the first prop shaft 21 to drive the rear wheels 16. Thus, depending upon the state of the disconnect device, the driveline 12 may provide torque to the rear wheels 16 only or to all four of the wheels 15, 16. Of course, other driveline configurations may be used, as desired.

Figure 2:
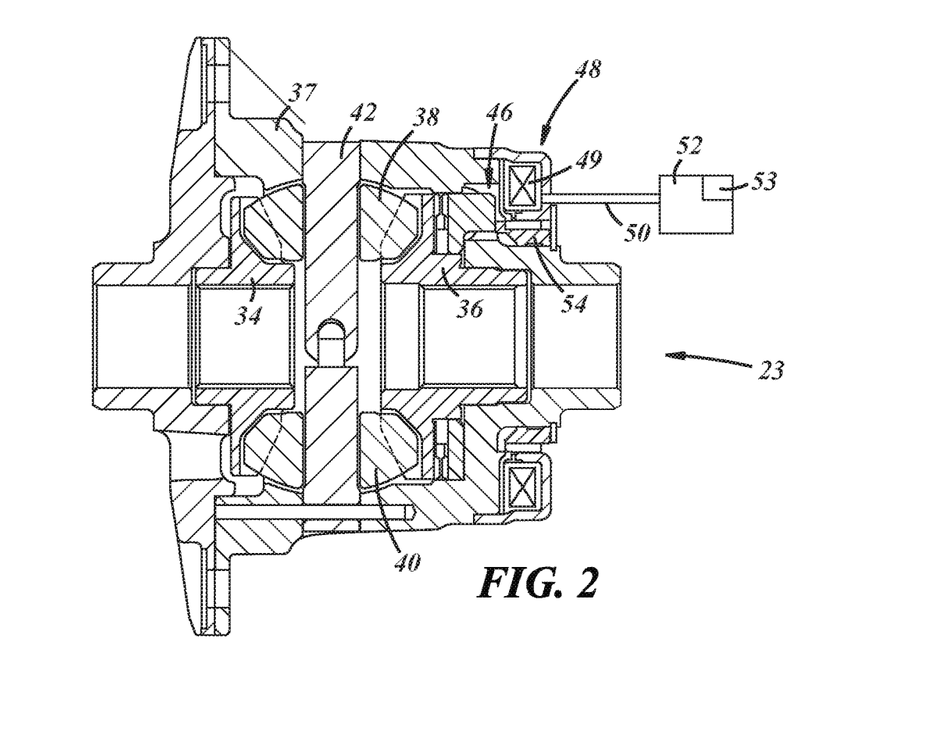
FIG. 2 is a cross-sectional view of a differential with an electrically actuated locking mechanism, wherein the differential shown in an open position.

Referring now to FIG. 2, the first rear side shaft 30 is connected to a first side gear 34 within the differential 23. Similarly, the second rear side shaft 32 is connected to a second side gear 36 within the differential 23. The differential 23 includes side gears 34, 36 that are generally carried within a housing 37 of the differential 23 and are rotatably coupled to the side shafts 30, 32, respectively. The differential also includes pinion gears 38, 40 that are meshed with side gears 34, 36, respectively, and which are mounted within the housing 37 on a pinion shaft 42.

To selectively lock and unlock the differential 23 a locking mechanism 46 is provided. In at least some implementations, the locking mechanism is electrically actuated and includes a solenoid 48 having an annular wire coil 49 and a drive member which may include an armature or plunger 54 received at least partially within the coil or in close proximity to the coil. In at least some implementations, the plunger 54 is also annular, the plunger and coil 49 are coaxially arranged and carried by the housing 37 for rotation with the housing, and one side shaft (here, the second rear side shaft 32) extends coaxially through the coil and plunger. Electric power is supplied to the coil 49 via a power wire 50 to generate a magnetic field which displaces the plunger 54 relative to the coil from a first or retracted position to a second or advanced position. To facilitate return of the plunger 54 from the second position back to the first position when power is not provided to the coil 49, a biasing member, such as a spring 55 (FIG. 3) may act on the plunger, or on a component engaged with the plunger, as set forth below. In at least some implementations, the locking mechanism 46 is actuated when the plunger 54 is in the second position and the locking mechanism is not actuated when the plunger is in the first position. While in the example shown the plunger 54 is in its second position when power is provided to the coil 49 and the plunger moves to the first position when power is not supplied to the coil, the opposite could be true if desired (e.g. the locking mechanism 46 could be moved to the actuated position by the biasing member 55 and deactuated by powering the coil).

In at least some implementations, the locking mechanism 46 may further include or be associated with a lock member 56 adapted to be driven by the plunger 54 and to interface with a differential side gear as set forth below. The lock member 56 may be generally annular and a portion of the second side gear 36 and/or shaft 32 may extend through the lock member. The lock member may include a rear face 57 engageable by the plunger 54 and a front face 59 having at least one engagement feature 58, such as gear or clutch teeth (e.g. dog clutch teeth) configured to engage a corresponding engagement feature 60 (e.g. gear or dog clutch teeth) formed on a rear face of the second side gear 36. The spring 55 may act on the lock member 56 to urge the lock member into the plunger 54 and move the plunger to its first position when the coil 49 is not powered, as noted above. In the implementation shown, the plunger 54 is located adjacent to one side of a housing wall 62 and the lock member 56 is located adjacent to the other side of the wall 62. The wall 62 includes voids 64, and the plunger 54 and lock member 56 include axially extending feet 66, 68 (FIGS. 3, 4, 10 and 11), respectively, that extend into or through the voids 64 in the wall so that the plunger and lock member are engaged with each other across or through the wall. Like the coil 49 and plunger 54, the lock member 56 also is carried by and rotates with the housing 37.

To control actuation of the locking mechanism 46, the coil 49 may be communicated with a processor 52 or controller. The processor 52 may selectively accesses a memory 53 (FIG. 2) and/or other computer-readable medium that includes instructions executable by the processor for selectively energizing the coil and driving the plunger, and for otherwise carrying out methods and steps as described herein. For example, the processor 52 may access a vehicle control module configured to provide directives for other vehicle systems.

Figure 3:
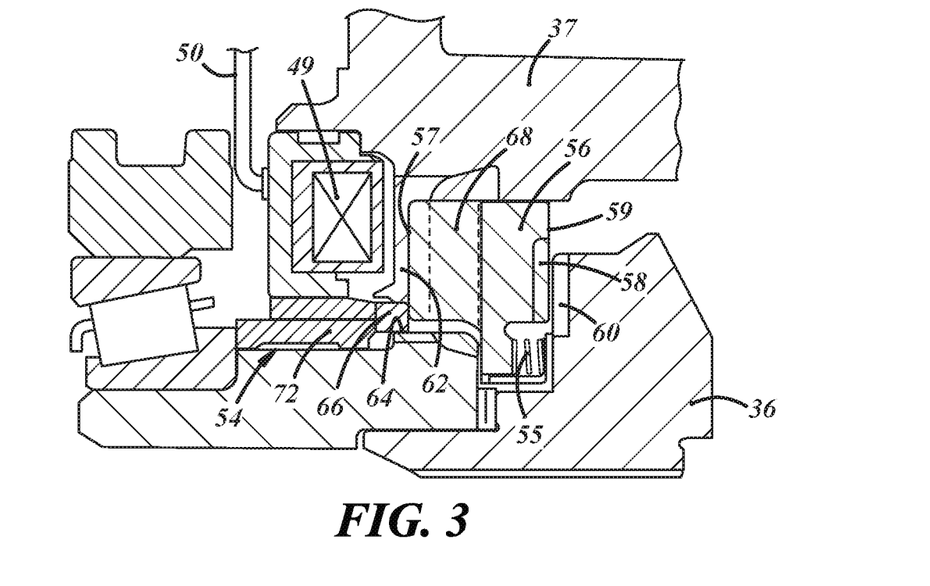
FIG. 3 is a fragmentary cross-sectional view of a portion of the differential, wherein the differential is shown in an open position.

The differential 23 illustrated in FIGS. 2 and 3 is shown in an open mode or position (FIG. 2). In the open position, the coil 49 is not powered, the plunger 54 is in its first position and the lock member 56 is not engaged with the side gear 36 so that the side gear can rotate relative to the lock member 56 and housing 37. In the open position, the side shafts 30, 32 may rotate at different speeds from one another. However, certain driving conditions may make it desirable for the side shafts 30, 32 to rotate in unison such that torque is applied to the wheel for which it is most useful.

Figure 4:
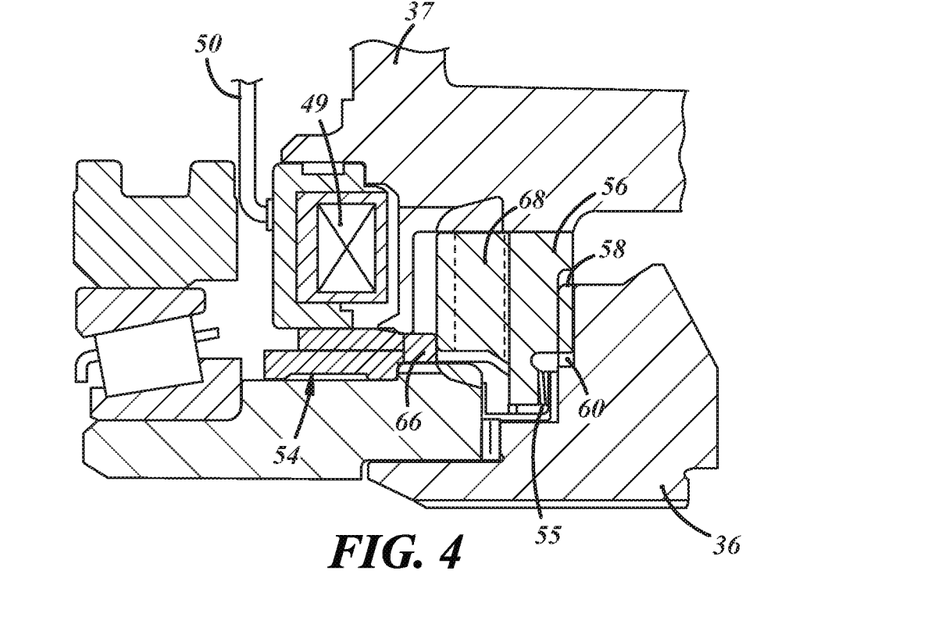
FIG. 4 is a fragmentary cross-sectional view of a portion of the differential, wherein the differential is shown in a locked position.

In the locked position, shown in FIG. 4, the coil 49 is powered, the plunger 54 is advanced to its second position which drives the lock member 56 into engagement with the side gear 36. Hence, the side gear 36 is coupled to the housing 37 so that the side gear rotates with and not relative to the housing. In effect, the second side shaft 32 is locked to and rotates with the housing 37, which in turn forces the first side shaft 30 and the second side shaft 32 to rotate in unison.

Actuation of the locking mechanism 46 may not guarantee that the lock member properly engages and couples with the side gear. For example, the axial ends of the teeth 58, 60 may align and, at least temporarily, face-to-face meshing of the teeth 58, 60 may be prevented. By contrast, the teeth are fully meshed and drivingly engaged in FIG. 4. In other words, the teeth 58, 60 may at times be positioned such that activation of the locking mechanism 46 does not properly engage the lock member 56 and side gear 36. Additionally, the teeth 58, 60 may skip or otherwise fail to engage even though the locking mechanism 46 is activated.

Deactivation of the locking mechanism 46 similarly does not guarantee the disengagement of the lock member 56 from the side gear 36. In other words, when the activation signal is removed from the locking mechanism 46 pressure or forces on the meshed teeth 58, 60 may prevent the lock member 56 from immediately disengaging from the side gear 36, and thus, the differential 23 may remain in the locked position shown in FIG. 4 for at least some time after the coil 49 is not powered. If the plunger 54 separates from the lock member 56 in such a situation, attempts to determine whether the differential 23 is locked or unlocked by monitoring the position of the plunger 54 will not be effective because the position of the plunger would not represent the position of the lock member 56.

Figure 15:
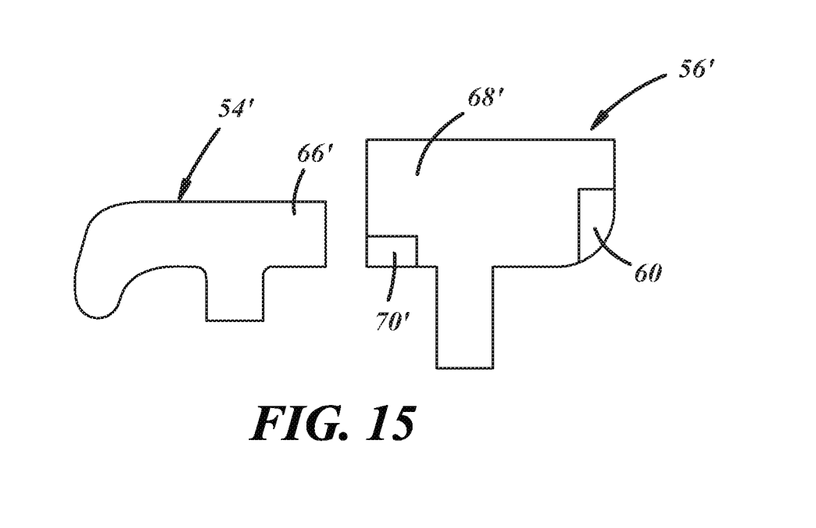
FIG. 15 is a diagrammatic side view of a plunger and locking member wherein coupling members are carried by the locking member.

Accordingly, the plunger 54 and lock member 56 are coupled together so that they move axially together, as a unit. In at least some implementations, such as the one shown in FIG. 10, one or both of the plunger 54 and lock member 56 include magnets 70 that provide a force holding the plunger and lock member together. In the example shown, the magnets 70 are carried by the plunger 54, in the feet 66 of the plunger. Whereas an annular body 72 (FIG. 3) of the plunger 54 is or may be received at least partially within the axial width or envelope of the coil 49, the feet 66 may extend at least partially beyond the coil envelope (where the coil 49 is generally cylindrical, the envelope may include the axial length of the interior of the cylinder). And in at least some implementations, the magnets 70 may be carried by the feet 66 so that the magnets are outside of the coil envelope whether the plunger 54 is in its first or second position. The magnets 70 may be otherwise carried by the plunger 54 (body 72 and/or feet 66), magnets may be carried instead or also by the lock member 56 and in the feet 68 of the lock member (if provided) or otherwise, as desired. FIG. 15 illustrates one implementation with one or more magnets 70' carried by the lock member 56', and within a foot 68' of the lock member for coupling with the plunger 54'.

Figure 9:
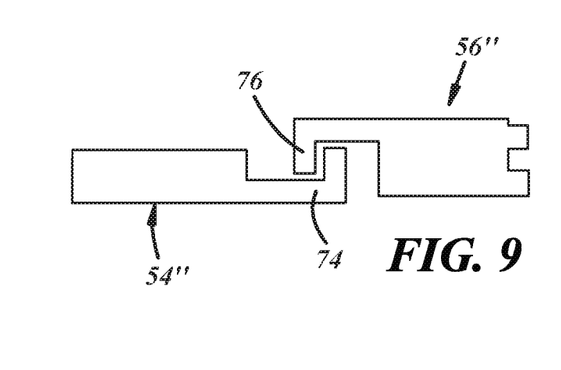
FIG. 9 is a diagrammatic view of a mechanically interlocked plunger and lock element of a locking mechanism.
Figure 10:
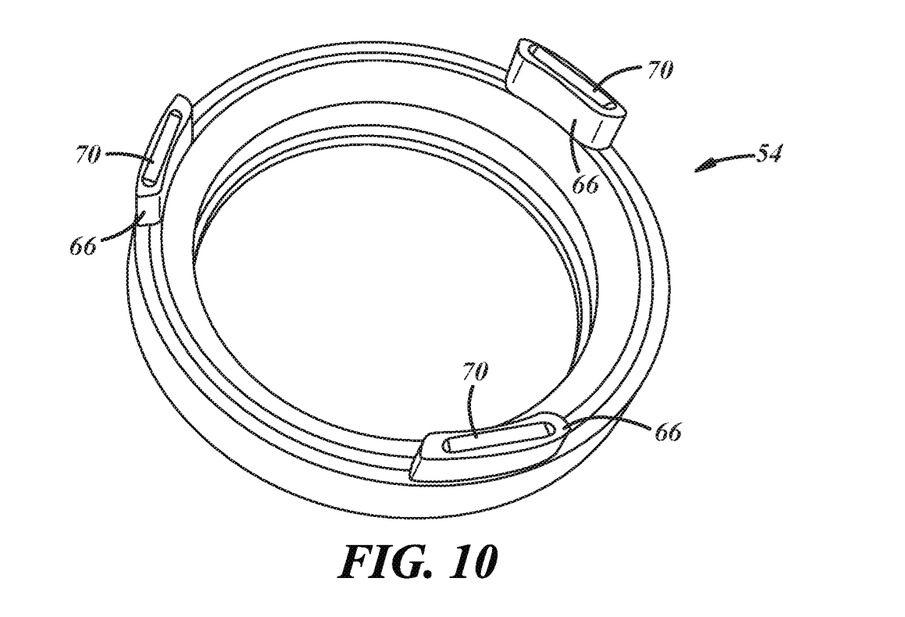
FIG. 10 is a perspective view of a plunger of the locking mechanism, illustrating coupling members in one or more feet of the plunger.
Figure 11:
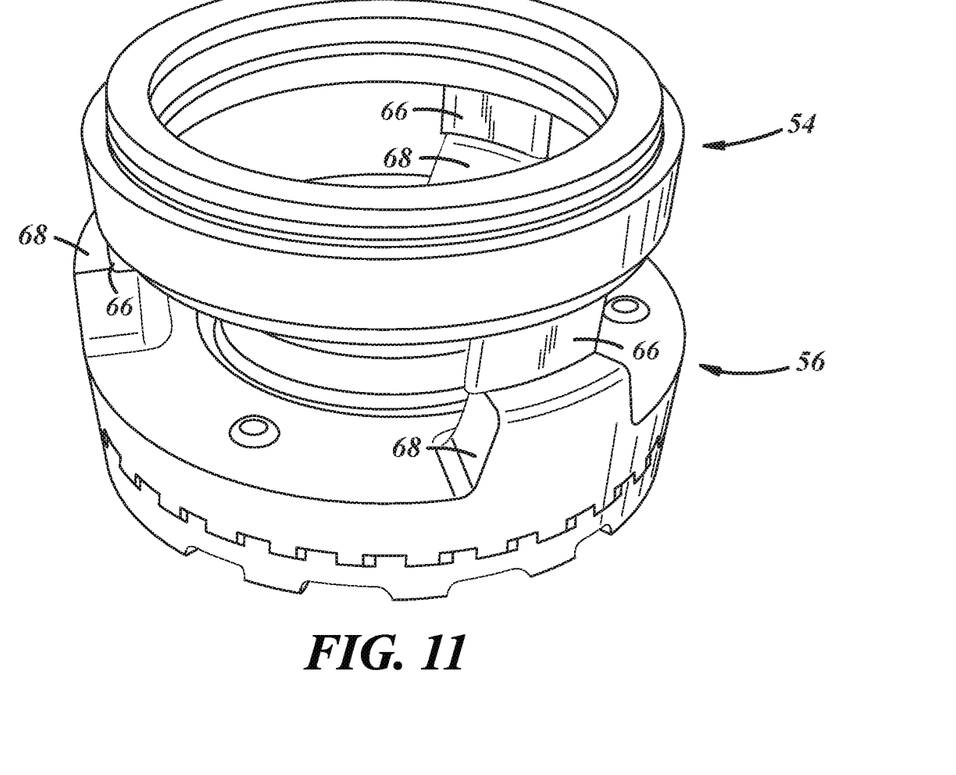
FIG. 11 is a perspective view of the plunger and a lock ring of the locking mechanism illustrating engaged, axially opposed feet on the plunger and lock ring.

FIG. 9 diagrammatically illustrates an alternate arrangement wherein, in addition to or instead of magnets, the plunger 54" and lock member 56" are mechanically coupled. In the example shown, the plunger 54" includes a hook 74 or catch and the lock member 56" includes a stop surface 76 axially opposed to the catch. While one is termed a catch and the other a stop surface, they may be of the same construction and arrangement, as desired. The stop surface 76 may be formed as a lip or ledge overhanging part of a groove in which the catch or hook 74 is received. In one example, the components may be rotatably positioned relative to each other to permit the hook to be received in a wider portion of the groove and then one or both components may be rotated so that the hook is axially overlapped by the stop surface. The various arrangements may provide a rigid connection that affords little to no relative movement between the plunger 54 and lock member 56, or a looser connection that permits relative radial and/or rotational movement between the plunger and lock member but inhibits relative axial movement (at least to the extent that the plunger may be in its first position while the lock member is engaged with the side gear). The plunger and lock member may also be bonded, adhered or otherwise coupled together after assembly into the differential.

Because activation of the solenoid 48 does not guarantee locking of the differential 23 and deactivation of the solenoid does not guarantee unlocking of the differential, the actual states of the differential 23 may be sensed or determined in one or more ways. For example, the processor 52 may be configured to be able to determine the actual status of the differential 23, i.e. in an open position (FIG. 2), the locked position (FIG. 4), an activated but unlocked position, or in a deactivated but locked position. The processor 52 may determine changes in differential 23 without an independent position sensor and the associated wiring and cost thereof. To this end, processor 52 may execute instructions related to a current profile 78 in the solenoid (see FIG. 5) to determine an actual status of the differential 23.

Figure 5:
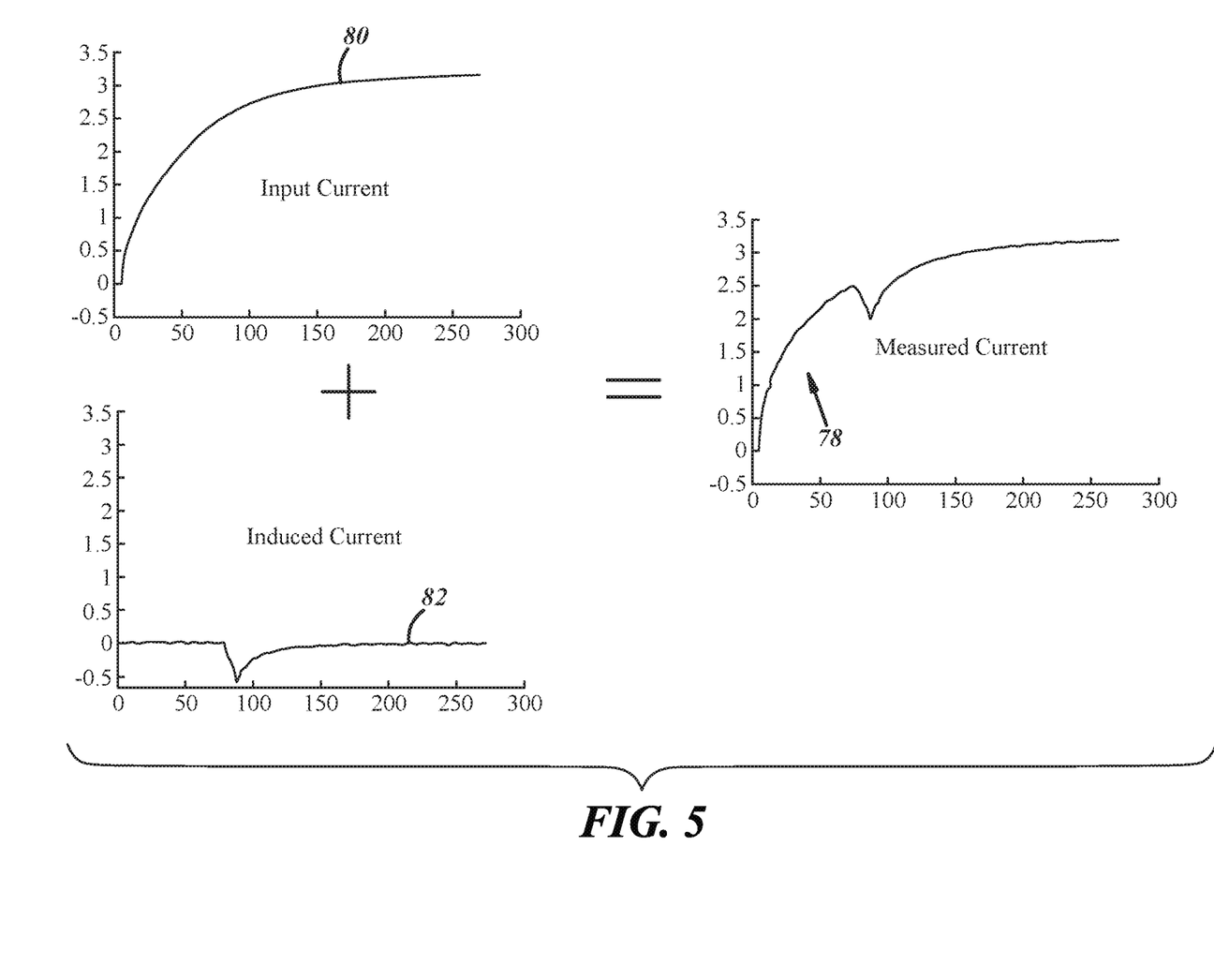
FIG. 5 is an illustration of a current profile resulting from superposition of current supplied to a wire with current induced in the wire.

As illustrated in FIG. 5, the current profile 78 is comprised of the activation signal 80 applied or removed from the solenoid 48 and/or locking mechanism 46, in addition to the induced current 82 generated by movement of the plunger 54 relative to the coil 49. Thus, the current profile 78 is a combination of the activation signal 80 and the induced current 82 which provides information about whether power is provided to the coil (e.g. the activation signal) as well as movement of the plunger relative to the coil (the induced current). The current profile 78 can be analyzed according to instructions executed by the processor 52 in real-time or near real-time to monitor and determine a position of the plunger which corresponds to the position of the lock member, and thus, whether the differential 23 is locked or unlocked.

Figure 6:
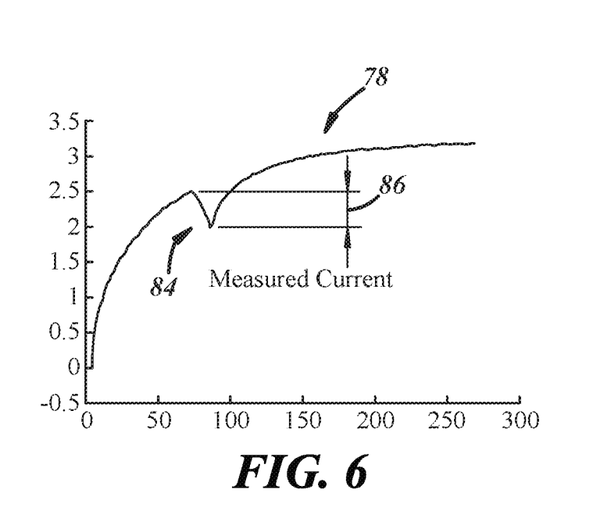
FIG. 6 is an illustration of a current profile representative of a situation in which the locking mechanism was activated and relatively quickly changed from an unlocked position to a locked position.

FIG. 6 is an illustration of a current profile 78 generated by the transition of differential 23 from the open position (FIG. 2) to the locked position (FIG. 4). In the example shown in FIG. 6, the majority of current profile 78 is a relatively smooth ascending curve representing application of the actuation signal 80 and an increase in current. A portion of the current profile 78, however, contains a first deviation 84 generated by the movement of the plunger 54 relative to the coil 49 and to the locked position (FIG. 4) which induces a current in the coil as noted above. The first deviation 84 includes a first deviation magnitude 86 which may be commensurate with the total current change from a start of the deviation to a peak, may relate to the time duration of the deviation, or a combination of the two. The first deviation magnitude 86 (actuated and locked, referred to as "A&L" hereinafter) is representative of the nature of the travel of the locking mechanism 46 to its locked position. For example, when the locking mechanism 46 travels from the unlocked position to the locked position relatively quickly, without interference between the lock member 56 and side gear 36 that would otherwise inhibit or slow the travel of the plunger 54, the first deviation magnitude 86 will be greater than if the plunger travel is slower. Other factors may affect the deviation magnitude 86, and merely as examples, the size or weight of the plunger 54, maximum current in the wire, number of turns in the coil 49, gauge of the wire, and/or the size or weight of other elements in communication with the plunger (for example, components of the differential 23), may affect the current induced in the coil upon movement of the plunger, and hence, the deviation magnitude 86 for a given differential 23.

Therefore, the first deviation 84 may be analyzed according to instructions executed by the processor 52 to determine if and when the locked position is actually achieved. In at least some implementations, the first deviation magnitude 86 may be compared to a first threshold, which may be associated with or correspond to a nominal deviation magnitude resulting from achieving the locked position instantly or nearly instantly. If the first deviation magnitude 86 is equal to or greater than the first threshold, then the processor 52 determines that the differential 23 achieved and is in the locked position. If the first deviation magnitude 86 is less than the first threshold, the processor 52 determines that the differential 23 is in the activated but unlocked position.

Figure 7:
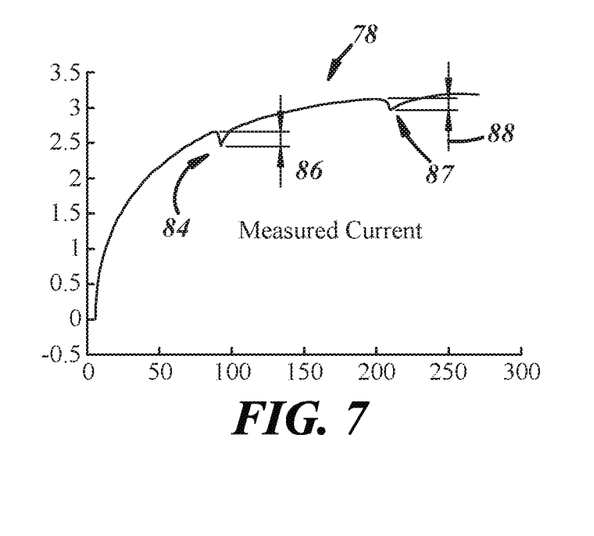
FIG. 7 is an illustration of a current profile representative of a situation in which the locking mechanism is activated but achieving the locked position was delayed.

The occurrence of a first deviation 84 of a magnitude smaller than the first threshold is illustrated in FIG. 7 which shows a first deviation magnitude $86_{A\&U}$ that is of lesser magnitude than the deviation $86_{A\&L}$ shown in FIG. 6. When a first deviation magnitude $86_{A\&U}$ less than the first threshold is detected, the system continues to monitor the current profile 78 for occurrence of a second deviation 87 having a second deviation magnitude 88. The second deviation 87 occurs upon further movement of the plunger 54 relative to the coil 49 which induces a current in the coil. This further movement of the plunger 54 indicates that the locking mechanism 46 achieved the locked position after initially failing to do so. Reliably determining the locked position of the locking mechanism 46 and hence the differential 23, can be useful for a wide variety of automotive applications.

Further, in a similar fashion, it can be determined if the differential 23 is in a deactivated but locked status. In such an instance, the power to the coil 49 has been terminated so the electromagnetic force displacing the plunger 54 to its advanced position has also been terminated, yet the plunger 54 remains at least partially advanced often due to forces holding the lock member 56 in engagement with the side gear 36. This is sometimes called a "torque trapped" situation. Contaminants or other interference in the path of the movement of the plunger 54 and/or lock member 56 may also inhibit or prevent return movement of the plunger 54 to its retracted position. In any event, in this situation, the coil 49 is not powered and the locking mechanism 46 is in the locked position.

Figure 8:
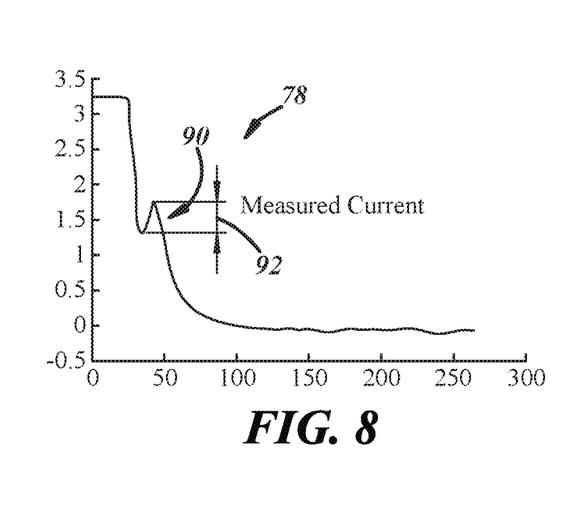
FIG. 8 is an illustration of a current profile representative of a situation in which the locking mechanism is deactivated and relatively quickly changes from the locked position to the unlocked position.

FIG. 8 is an illustration of a current profile 80 generated by the transition of the locking mechanism from the locked position to the open position. As can be seen, the current profile 80 illustrated in FIG. 8 includes a precipitous drop represented by the removal of the actuation signal 80. The current profile 78, however, contains a relatively quickly occurring first spike 90 generated by the movement of the plunger 54 relative to the coil 49 and into the open position. The relatively quickly occurring first spike 90 has a first spike magnitude 92. The first spike 90 may be present in a primary transition of the current profile 80 from a current level associated with continued activation of the locking mechanism (shown in FIG. 8 to be 3.25 amps) to a lower current that may include a fully decayed current at about zero amps. In the example illustrated in FIG. 8, the current decays to zero amps in about 100 ms, and the first spike 90 occurs before full current decay. In at least some implementations, the first spike 90 occurs within 30 to 150 ms of coil deactivation. In at least some implementations, the first spike 90 associated with rapid return of the locking mechanism 46 to the unlocked position may occur before the current decays below approximately 0.005 Amperes.

To determine whether the locking mechanism 46 has moved to the unlocked position, the first spike 90 may be compared to one or more thresholds (which may individually or collectively be referred to as a second threshold) which may, in at least some implementations, relate to the magnitude 92 of the spike (i.e. the amount of current change during the spike), the duration of the spike, the amount of time between the spike and deactivation of the coil 49, presence of the spike before the current in the coil falls below a threshold, or a combination of two, three or all of these criteria. If the comparison of the first spike 90 is satisfactory (e.g. the magnitude 92 is above a threshold and/or the timing/current threshold is satisfied), then it may be determined that the locking mechanism 46 has moved to the unlocked position (and hence, the differential 23 is in its open position).

If, however, the locking mechanism 46 remains in the locked position after removal of the actuation signal 80, then the first spike 90 will not satisfy the condition(s) of the second threshold. The processor 52 may then execute a process set forth later which infers a difference in distance of the locking mechanism between the locked and unlocked position to determine the state of the locking mechanism.

For example, determinations of the state of the locking mechanism 46, and hence, the differential 23, can be made with only the components of the locking mechanism 46, and without the cost and complexity of independent sensor assemblies. In addition, although the superposition current may be adequate for proper determination of differential state change, it is contemplated that the present system may be utilized in combination with other status verifying methodologies, e.g., wheel speed sensing systems or independent transducer systems.

Figure 13:
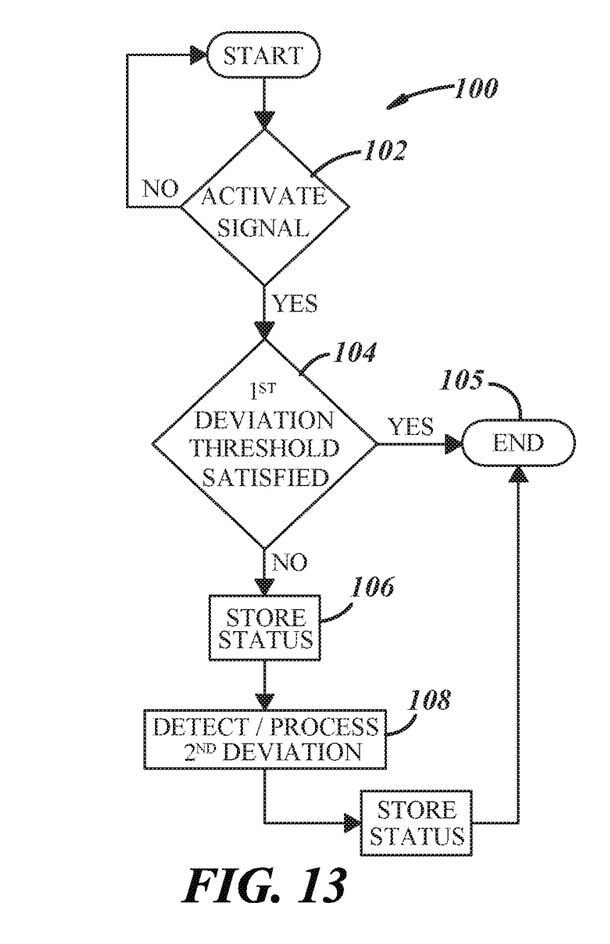
FIG. 13 is a flow chart for a process for actuating the locking mechanism and determining the status of the differential assembly.

Turning now to FIG. 13, one implementation of a process 100 for actuating a locking mechanism from an open to a locked position is illustrated. Process 100 begins at step 102 wherein it is determined if an activating signal has been provided to the coil to move the locking mechanism to the locked position. In at least some implementations, the current initially supplied to drive the plunger 54 to its advanced position may be greater than a current applied to hold the plunger in its advanced position. This may be achieved in various ways, including with a pulse width modulated power supply to the coil 49. Accordingly, to determine if an actuation signal has been provided, the system may check for a current in the coil 49 above a threshold (which may be called a fourth threshold). If it is determined that an actuation signal has been provided, the process proceeds to step 104. If it is determined that an actuation signal has not been received, the process may loop back to the start. This process could also be a subroutine for other control processes, and as such, may only begin after an actuation signal is detected. In that case, the process would essentially begin at step 104.

In step 104, a current profile associated with the activation signal is monitored until a first deviation occurs and the first deviation is compared to a first threshold. If the first threshold is satisfied, it is determined that the locking mechanism achieved the locked position and the method ends at 105. If the first threshold is not satisfied, it is determined that the locking mechanism is in an activated but unlocked condition and the process proceeds to step 106.

In step 106, the status of the locking mechanism may be recorded, e.g. in the memory. For example, processor 52 may be associated with memory 53 that stores at least the most recently determined differential assembly status. The stored differential assembly status may then be selectively retrieved by processor 52 or any other vehicle system or processor in communication with the memory, as may be convenient. For example, vehicle stability control systems, vehicle traction control systems, or anti-lock braking systems may selectively retrieve this information from the memory as may be convenient.

The process may then proceed to step 108 wherein the current profile is monitored to determine later occurrence of a second deviation. Upon detecting a second deviation, it may be compared to a threshold, if desired. Otherwise, occurrence of a second deviation (or an occurrence that satisfies at least one threshold) indicates that the plunger has moved to its advanced position which is associated with the locked position of the locking mechanism, and the process may end at 105. The status of the locking mechanism may be stored in memory in step 110 before the process ends, if desired.

Figure 14:
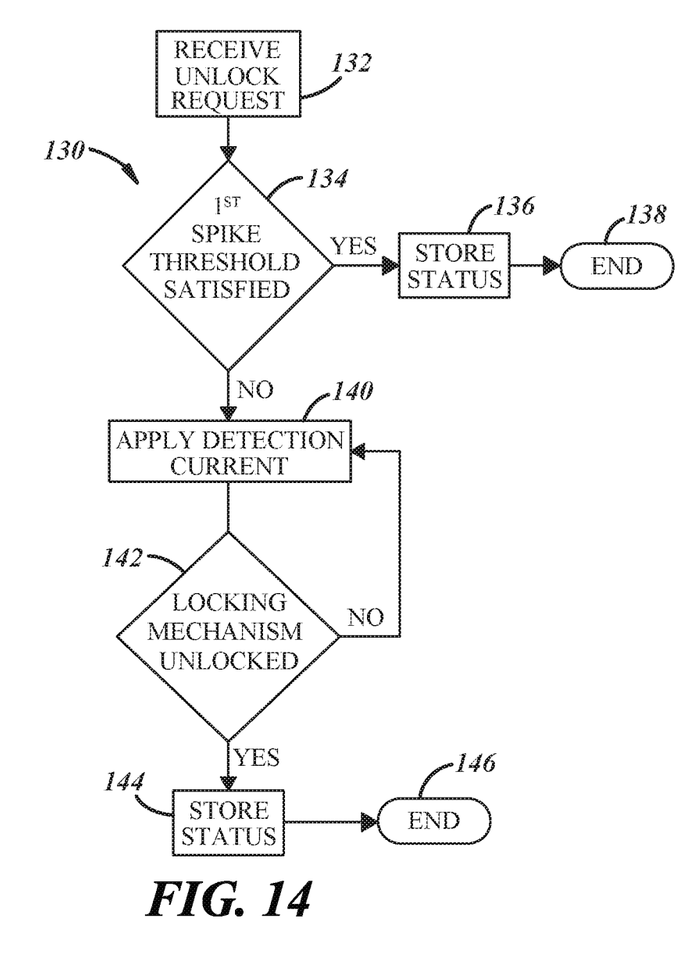
FIG. 14 is a flow chart for a process for deactuating the locking mechanism and determining the status of the differential assembly.

To determine if the locking mechanism has moved to the open position upon deactivation of the locking signal, the process 130 shown in FIG. 14 may be used. This process 130 may be a continuation of the process 100 or a subroutine from another process or program. The process 130 may begin at 132 upon detection of a unlock request signal or upon detecting the termination of power to the coil 49 which indicates that the locking mechanism 46 is now intended to be the unlocked position. When it is determined that the locking mechanism should move to the unlocked position, the process 130 proceeds to step 134 in which the current profile is monitored for occurrence of a first spike.

When a first spike 90 is detected, it is compared in step 134 to a threshold which, if satisfied, indicates that the locking mechanism 46 has moved to the unlocked position in a normal and prompt manner. That is, the locking mechanism 46 is not in the previously described deactivated but locked condition, and is instead deactivated and unlocked as intended. The process may proceed to step 136 in which the status of the differential 23 is stored in or added to memory, and then end at step 138 (which may loop back to the start of process 100 to check for a locking mechanism activation signal).

If the threshold comparison in step 136 is not satisfied (i.e. does not indicate that the locking mechanism 46 has moved to the unlocked position), then it is determined that the locking mechanism is in the deactivated but locked condition and the process proceeds to step 140.

Figure 12:
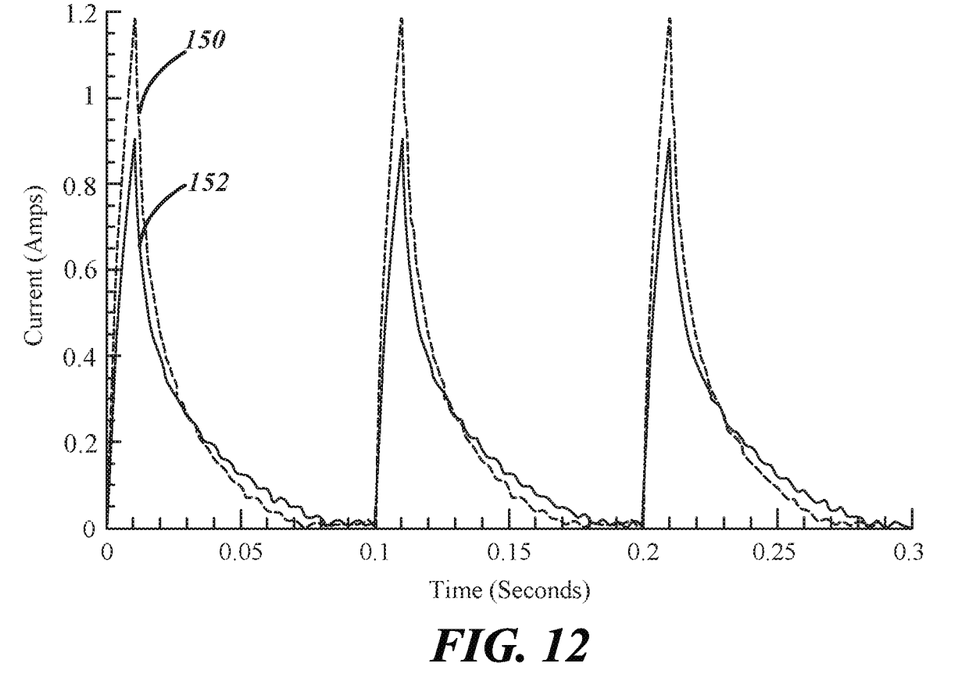
FIG. 12 is a current profile showing application of three separate detection currents.

Proceeding to step 140, a detection current is applied to the coil 49 to determine the plunger position as a function of the magnitude of the resulting current sensed in the coil 49. The plunger position may be determined as a function of the inductance within the assembly when the detection current is applied, as the inductance within the assembly is different when the plunger 54 is retracted (locking mechanism is unlocked) than when the plunger is advanced (locking mechanism is locked). When the plunger 54 in its advanced position, more of the plunger may be received within the envelope of the coil 49 (i.e. the plunger is received more closely to more of the turns of the coil) than when the plunger 54 is in its retracted position. When the plunger is in the retracted position the inductance in the assembly is less than when the plunger is in the advanced position. Thus, the slope and/or peak magnitude of a current profile in the coil 49 after application of the detection current will be greater when the plunger 54 is in the retracted position than when the plunger is in the advanced position. Representative plots showing current in the coil 49 after several applications of a detection current are shown in FIG. 12, wherein the current in the coil 49 when the plunger 54 is retracted is shown by line 150 and the current in the coil when the plunger is advanced is shown by line 152. In the non-limiting example shown, the current in the coil 49 when the plunger 54 is retracted is about 1.25 amps and about 0.9 amps when the plunger is advanced. In this graph, the decay of the current in the coil 49 is not shown as the focus of the graph is on application of detection current(s) and the resulting current in the coil 49. The method may include a step in which a time period elapses or in which the current is monitored until it has sufficiently decayed, which may but need not include full decay of the current in the coil, before the process continues.

The detection current may be of a fixed magnitude (or frequency in a PWM system) and applied for a relatively short period of time. The detection current may be less than a current used to move the plunger 54 to its advanced position so that the detection current does not cause undesired movement of the plunger. The goal in this step is to determine plunger position, not to drive or move the plunger 54. In one non-limiting example, the current may be applied at a relatively low frequency (in a PWM system), for example between 1 Hz and 1 kHz. and in at least some implementations about 10 Hz may be used. With the difference in current attributable to plunger position, the current in the coil 49 after application of a detection current can be compared in step 142 to one or more thresholds to determine the position of the plunger 54.

If in step 142 the current in the coil after application of the detection current indicates that the plunger 54 is in the retracted position, the process 130 may proceed to step 144 in which the differential status (i.e open) is stored in memory and then end at step 146. Otherwise, another detection current may be applied to confirm the result.

If the current in the coil after application of the detection current indicates that the plunger 54 is not in the retracted position, the process may return to step 140 whereupon another detection current is applied to the coil 49. This may be repeated until the obtained result indicates that the plunger 54 has moved to the retracted position such that the locking mechanism is unlocked, in which case the method may proceed to step 144 and then end at 146.

Application of the detection current and detection of the resulting current may be undertaken at other times as well, to detect the instantaneous position or state of the locking mechanism 46. For example, even with detection of a current deviation that satisfies the one or more thresholds for such deviation and thereby indicates the locking mechanism position, the detection current application scheme could be used to confirm the actual position. In at least some implementations (such as to detect an activated and locked position), this may be done with a PWM current near 100% and slight differences in current falloff may be determined, as opposed to current rise.

A locking mechanism 46 for a vehicle differential assembly may include a lock element 56 movable in response to an actuation signal between an unlocked position and a locked position. The lock element 56 may be configured to permit side gears 34, 36 of the differential assembly 23 to turn at varying rates relative to one another when the lock element is in the unlocked position, which corresponds to an open position of the differential 23. The lock element 56 also generally forces the side gears 34, 36 to turn generally at a same rate when the lock element is in the locked position, which corresponds to the locked position of the differential 23. The locking mechanism 46 may further include or be associated with a processor 52 operable to determine a status of the differential assembly 23 from a current profile that includes one or more of an actuation signal, an induced current and a detection signal. The determined differential assembly status is generally one of an "activated and locked" status, an "activated but unlocked" status, a "deactivated but locked" status, and a "deactivated and unlocked" status. In at least some implementations, the locking mechanism 46 include a wire coil 49, a plunger 54 driven by a magnetic field generated by the coil, and a lock member 56 coupled to the plunger for movement with the plunger. The lock member 56 interfaces with a gear 36 of the differential 23 to change the status of the differential between open and locked positions, as set forth above. With the lock member 56 coupled to the plunger 54, determination of the position of the plunger is also determinative of the lock member position and hence, the status of the differential 23.

A method of determining a differential assembly status generally includes receiving an activation signal at a locking mechanism of the differential assembly. The locking mechanism is configured to move in response to the activation signal between an unlocked position, corresponding to an open differential 23, and a locked position, corresponding to a locked differential 23. The method further includes monitoring a current profile in the locking mechanism and determining a status of the differential assembly from the current profile. If a deactivated but locked position is detected, one or more instances of a detection current may be applied to the locking mechanism. The resulting current in the coil of the locking mechanism is indicative of the position of the locking mechanism due to differences in the inductance in the locking mechanism between its unlocked and locked positions.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

It is to be understood that the above description is intended to be illustrative and not restrictive. Many embodiments and applications other than the examples provided would be apparent to those of skill in the art upon reading the above description. The scope of the invention should be determined, not with reference to the above description, but instead with reference to the appended claims, along with the full scope of equivalents to which such claims are entitled. It is anticipated and intended that future developments will occur in the arts discussed herein, and that the disclosed assemblies and methods will be incorporated into such future embodiments. In sum, it should be understood that the invention is capable of modification and variation that is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. In the preceding description, various operating parameters and components are described for one or more exemplary embodiments. These specific parameters and components are included as examples and are not meant to be limiting.

Reference in the preceding description to "one example," "an example," "one embodiment," "an embodiment". "an implementation" or "at least some implementations" means that a particular feature, structure, or characteristic described in connection with the example is included in at least one example or implementation including one or more but not necessarily all innovative features or components. References to various examples, embodiments or implementations do not necessarily refer to the same example, embodiment or implementation each time it appears.

The invention claimed is:

1. A system for a vehicle differential having multiple gears, comprising:
    a coil;
    a drive member movable in response to a magnetic field generated by application of electricity to the coil between a first position and a second position;
    a lock member coupled to the drive member for movement with the drive member throughout a range of movement of the drive member, the lock member is adapted to engage a gear of the differential when the drive member is in the second position and the lock member is adapted to be disengaged from the gear by a force provided on the lock member by the drive member when the drive member is in the first position and wherein one or both of the drive member and lock member include at least one magnet and a coupling between the drive member and the lock member is magnetic.

2. The system of claim 1 wherein the lock member is adhered to the drive member.

3. The system of claim 1 wherein the drive member and lock member move axially relative to the coil and wherein one or both of the drive member and the lock member have at least one axially extending foot and a magnet is carried by the foot.

4. The system of claim 3 wherein the coil defines an envelope in which a coil wire is received, and wherein the magnet is located outside of the coil envelope in both the first position and the second position of the drive member.

5. The system of claim 1 which also includes a housing of the differential which includes a wall with at least one void, and wherein the coil is located adjacent to one side of the wall and the locking member is located on an opposite side of the wall, and wherein at least one of the drive member and the lock member includes a portion extending into or through the void, and the drive member and the locking member are coupled together across the wall.

6. The system of claim 1 which also includes a processor communicated with the coil and configured to determine the position of the locking member from a current profile, the current profile including an actuation signal applied to the coil to move the drive member relative to the coil and an induced current in the coil caused by movement of the drive member relative to the coil.

7. The system of claim 6 wherein the current profile includes a detection current having a magnitude that is less than the actuation signal.

8. A method of determining the status of a differential locking mechanism, comprising the steps of:
    receiving a signal indicative that the locking mechanism should be in a first position;
    determining that the locking mechanism is in a second position and not the first position;
    applying a detection current to the locking mechanism;
    determining the position of the locking mechanism as a function of the current in the locking mechanism after application of the detection current; and
    if the determined position of the locking mechanism after application of the detection current is not the first position, then applying another detection current to the locking mechanism and determining again the position of the locking mechanism after reapplication of the detection current.

9. The method of claim 8 wherein the signal indicative that the locking mechanism should be in the first position is the termination of an actuation signal for the locking mechanism.

10. The method of claim 9 wherein the detection current is of lower magnitude than that actuation signal.

11. The method of claim 8 wherein the current in the locking mechanism after application of the detection current is of a magnitude that corresponds to the inductance within the locking mechanism which changes as the position of the locking mechanism changes.

* * * * *